(12) United States Patent
Conlan et al.

(10) Patent No.: US 7,599,934 B2
(45) Date of Patent: Oct. 6, 2009

(54) SERVER SIDE FILTERING AND SORTING WITH FIELD LEVEL SECURITY

(75) Inventors: Patrick M. Conlan, Redmond, WA (US); Aaron M. Jensen, Seattle, WA (US); Chih-Jen Huang, Kirkland, WA (US); Robert C. Turner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 11/235,784

(22) Filed: Sep. 27, 2005

(65) Prior Publication Data

US 2007/0073695 A1 Mar. 29, 2007

(51) Int. Cl.
*G06F 17/30* (2006.01)
*H04L 9/00* (2006.01)

(52) U.S. Cl. .................... 707/9; 707/2; 713/182
(58) Field of Classification Search ............ 707/9, 707/2; 713/182
See application file for complete search history.

(56) References Cited

U.S. PATENT DOCUMENTS

| | | | |
|---|---|---|---|
| 6,374,239 B1 | 4/2002 | Anderson | |
| 6,820,082 B1* | 11/2004 | Cook et al. | 707/9 |
| 6,917,937 B1 | 7/2005 | Rubendall | 707/5 |
| 6,925,586 B1 | 8/2005 | Perrella et al. | 714/57 |
| 6,990,480 B1* | 1/2006 | Burt | 707/1 |
| 7,013,312 B2* | 3/2006 | Bala et al. | 707/200 |
| 7,228,307 B2* | 6/2007 | Dettinger et al. | 707/100 |
| 2002/0016924 A1* | 2/2002 | Shah et al. | 713/200 |
| 2002/0120626 A1 | 8/2002 | Wegener | |
| 2002/0133720 A1 | 9/2002 | Sherman et al. | 713/201 |
| 2003/0023597 A1 | 1/2003 | Ha | |
| 2003/0084350 A1 | 5/2003 | Eibach et al. | 713/201 |
| 2003/0135498 A1 | 7/2003 | Bodin | |
| 2004/0073811 A1 | 4/2004 | Sanin | 713/201 |
| 2004/0181679 A1 | 9/2004 | Dettinger et al. | |
| 2004/0186762 A1* | 9/2004 | Beaven et al. | 705/8 |
| 2004/0255158 A1 | 12/2004 | Lin et al. | 713/201 |
| 2005/0010565 A1* | 1/2005 | Cushing et al. | 707/3 |
| 2005/0034150 A1 | 2/2005 | Muraoka | 725/31 |
| 2005/0049992 A1 | 3/2005 | Gupta | |

(Continued)

OTHER PUBLICATIONS

"*Microsoft Project Server 2002 Architecture and Extensibility*"; Apr. 1, 2002; 11 pages; http://www.microsoft.com/technet/prodtechnol/project/project2002/plan/psvrarch.mspx#EDAA.

(Continued)

*Primary Examiner*—Etienne P LeRoux
*Assistant Examiner*—Cindy Nguyen
(74) *Attorney, Agent, or Firm*—Merchant & Gould P.C.

(57) ABSTRACT

A project management system is enabled to implement filtering, sorting, and field level security for data associated with managed projects. A filter for field selection is prepared by a project client application and forwarded to a project server. The server generates an access attribute table based the user permissions that may be set for each field within the managed projects. Upon retrieving the selected fields from project database, the project server builds a secured list of fields. A data set to be provided to the project client is prepared by removing the fields for which the user lacks the requisite access permission prior to sorting the data. The removed data may be used for user-transparent computations within the project server, but guarded from client applications.

6 Claims, 7 Drawing Sheets

U.S. PATENT DOCUMENTS

| | | | |
|---|---|---|---|
| 2005/0108396 A1* | 5/2005 | Bittner | 709/225 |
| 2005/0114404 A1 | 5/2005 | Pintar | |
| 2005/0197896 A1 | 9/2005 | Veit | |
| 2006/0230282 A1* | 10/2006 | Hausler | 713/182 |
| 2007/0027868 A1* | 2/2007 | Mohammed | 707/7 |

OTHER PUBLICATIONS

"XS40 XML Security Gateway"; 5 pages; http://www.datapower.com/products/xs40.html.

Rich Salz; "Essential XML Web Services Security Practices"; Feb. 2002; 12 pages; http://www.idealliance.org/papers/dx_xml03/papers/05-04-02/05-04-02.html.

Aug. 23, 2007 Non-Final Office Action issued in U.S. Appl. No. 11/263,003.

Jan. 4, 2008 Final Office Action issued in U.S. Appl. No. 11/263,003.

Jun. 12, 2008 Non-Final Office Action issued in U.S. Appl. No. 11/263,003.

Jan. 7, 2009 Final Office Action issued in U.S. Appl. No. 11/263,003.

May 27, 2009 Non-Final Office Action issued in U.S. Appl. No. 11/263,003.

* cited by examiner

SERVER SIDE FILTERING AND SORTING WITH FIELD LEVEL SECURITY

BACKGROUND

Project management systems include a number of applications, computing devices, and input devices that schedule, track, and report tasks and resources associated with projects for a variety of organizations. In today's global economy, many enterprises execute projects in various countries, regions, and localities. While some projects may be managed at the local level and results reported to a higher organizational level such as an enterprise level, other organizations might prefer to schedule and track projects across countries.

Project management systems typically have two prominent functions: calculation of project parameters, such as time and resource tracking, and presentation of calculation results to users in the form of reports. Additional functionalities such as workflow coordination, user alerting, performance evaluation, and the like may also be implemented as part of the project management system.

Because a variety of users may provide inputs and request reports involving one or more projects within a project management system, security and user-friendly presentation of project data is a challenge for project management system designers and implementers.

SUMMARY

A project management system is directed at providing filtering, sorting, and field level security for data associated with managed projects. A filter that is used for field selection may be based on one or more rules that may be prepared by a project client application and then forwarded to a project server. The project server may generate a query set based on the filter and an access attribute table based on user permission rules for each field within the managed projects.

Upon retrieving the selected fields from a project database, the project server may build a secured list of fields. A sorted data set is prepared by removing fields for which the user lacks requisite access permission, which may then be provided to the project client.

Removed data may be used for user-transparent computations within the project server, but guarded from client applications. Selection or permission rules may be modified dynamically, if the original data is modified by a user with permission.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
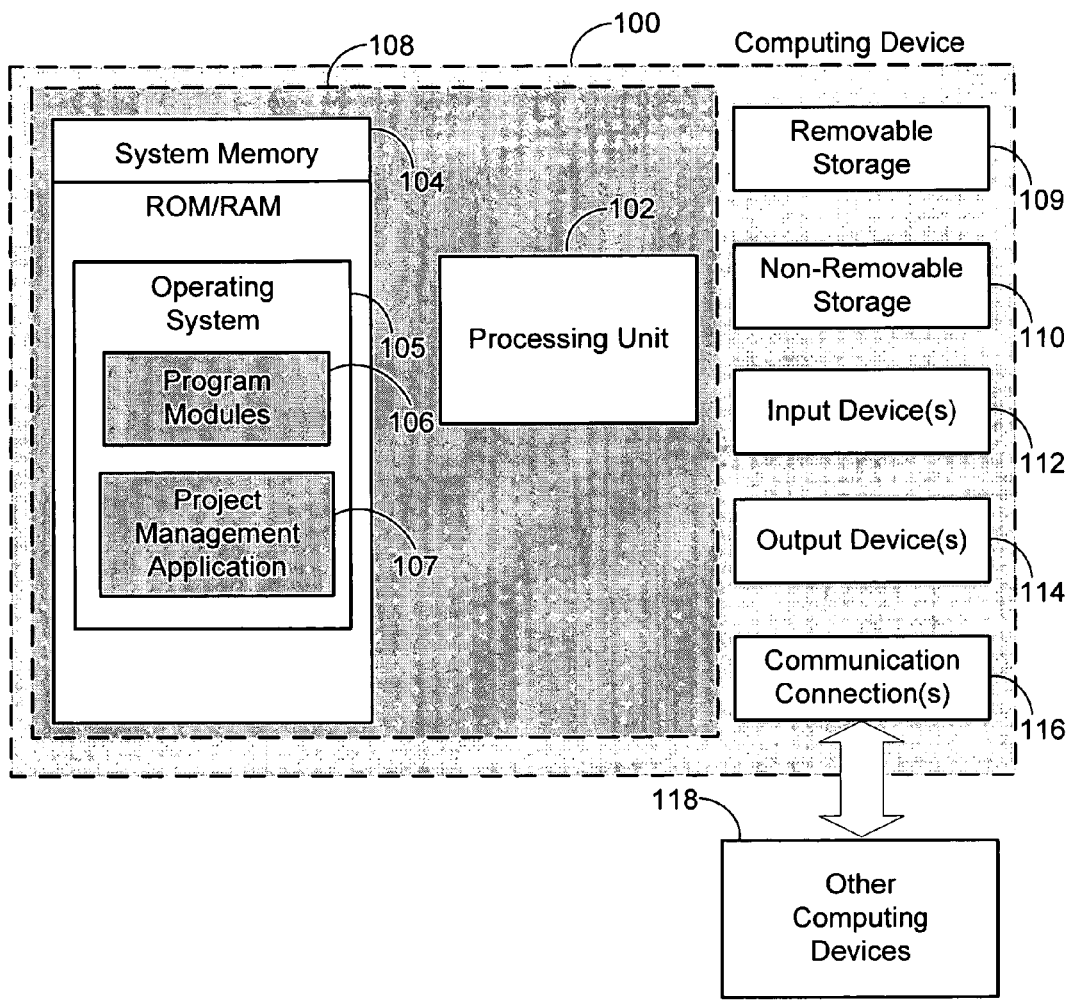
FIG. 1 illustrates a computing device in which a project management system with server-side filtering and sorting according to an example aspect may be executed.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105 and one or more program modules 106 working within operating system 105.

In addition to program modules 106, project management application 107 may also be executed within operating system 105. Project management application 107 may be arranged to schedule, track, and provide various reports of tasks and resources associated with projects.

In one embodiment, project management application 107 may facilitate server-side filtering, sorting, and field level security. To perform the actions described above, project management application 107 may include and/or interact with other computing devices and applications and application interfaces (APIs) residing in other applications such as filter builder API shown in FIG. 3.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
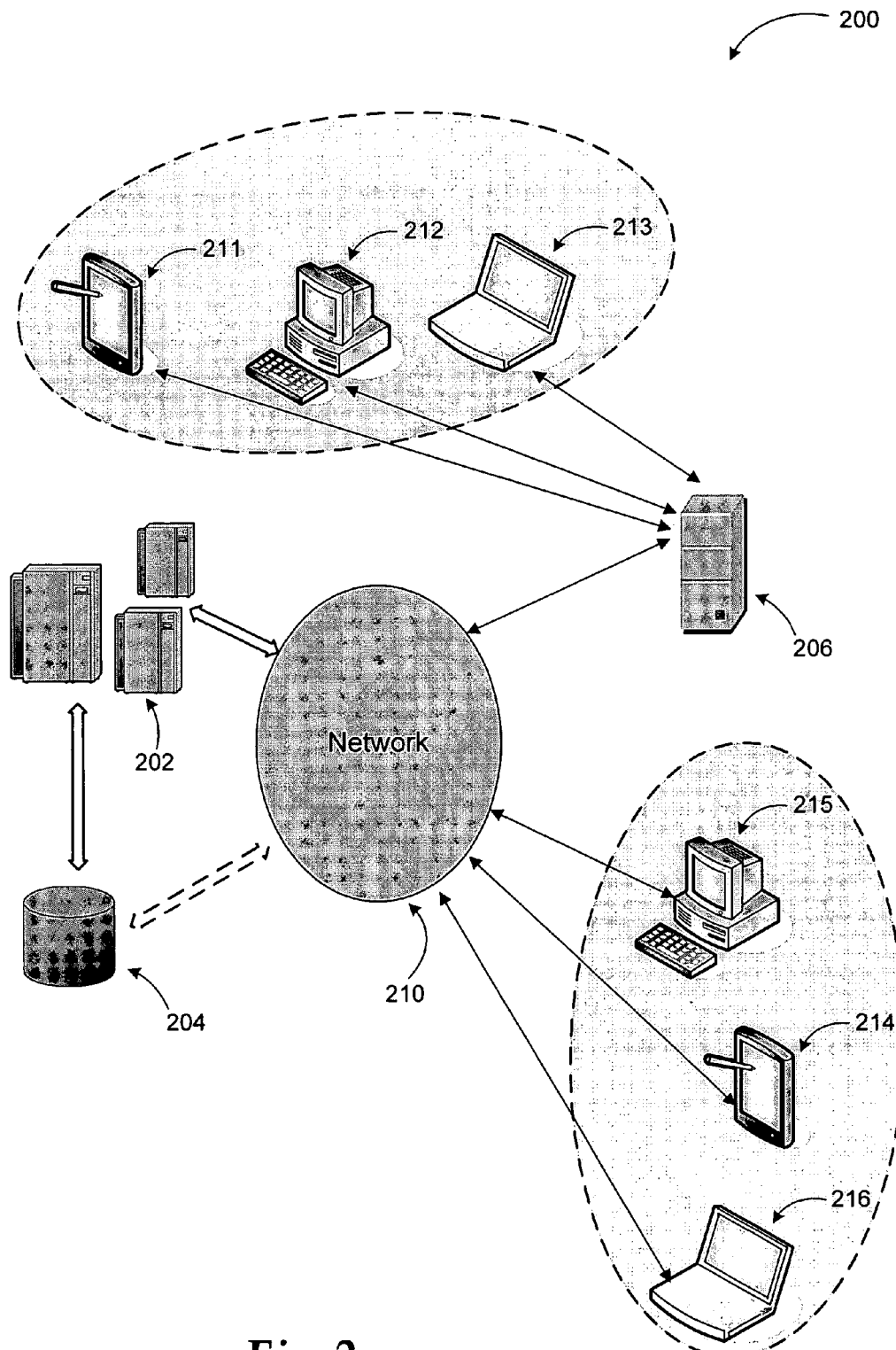
FIG. 2 illustrates an example system, where aspects of a project management system may be implemented.

FIG. 2 illustrates example system 200, where aspects of a project management system may be implemented. System 200 may include one or more networks that comprise any topology of servers, clients, Internet service providers, and communication media. The networks may also have a static or dynamic topology.

A project management application, such as project management application 107 of FIG. 1, may reside on server 202. In one embodiment, the application may be run across distributed servers, mainframe computers, and the like in an enterprise environment. Server 202 may include a number of other applications such as accounting applications, database applications, communication applications, and the like.

In another embodiment, server 202 may interact with project database 204 that is arranged to store project related data. Project database 204 may also be accessed directly by other components of the project management system such as client devices, other servers, and the like.

The project management application may interact with client devices, such as handheld computer 214, desktop computer 215, and laptop computer 216, over network 210 to collect data associated with the project(s), provide reports, and perform other project related tasks. Client devices communicating with server 202 may include any type of computing device, not limited to the examples shown herein.

In another embodiment, one or more client devices, such as handheld computer 211, desktop computer 212, and laptop computer 213, may be managed by a separate server (e.g. server 206) interact with server 202 through server 206 for enterprise level project activities.

Network 210 may be a secure network such an enterprise network, or an unsecure network such as a wireless open network. Network 210 provides communication between the nodes described above. By way of example, and not limitation, network 210 may include wired media such as a wired network or direct-wired connection, and wireless media such as acoustic, RF, infrared and other wireless media.

The present invention is not limited to the above-described environment, however. Many other configurations of computing devices, communications, applications, and distribution systems may be employed to implement a project management application implementing server-side filtering, sorting, and field level security.

Illustrative Embodiments for a Project Management Application Implementing Server-Side Filtering, Sorting, and Field Level Security Organizations that manage multiple projects with different resources, users, locations, and the like, may have a number of concerns regarding efficient management of their projects and security of their project data, such as costs, on-time performances, and the like. Commonly, project applications filter and sort at the client. This may result in degraded performance, because more than the needed data is typically retrieved from the server. In addition, retrieval of data without any restrictions presents a security challenge.

Embodiments of the present invention are directed to implementing server-side filtering, sorting, and field level security. According to one embodiment, the server-side filtering, sorting, and field level security is implemented within a project management system. Many projects involve a number of users who are responsible for managing resources and tasks associated with the project. The users may receive reports from the project application, periodically or upon request. Such reports may include status of tasks or resources, costs, performance, comparisons, and the like.

In some cases, users may be allowed to view reports for tasks and resources not necessarily managed by them. In other cases, an enterprise level project manager may desire to restrict permissions based on predetermined criteria. In yet other cases, multiple projects may be managed at the enterprise level and different users may have different permissions based on their position within the enterprise. For example, marketing managers may be allowed to view progress reports for all projects, while accounting managers may only be allowed to view cost reports for certain projects. Thus, a complex system of access permissions may be desired by the enterprise for its projects.

Figure 3:
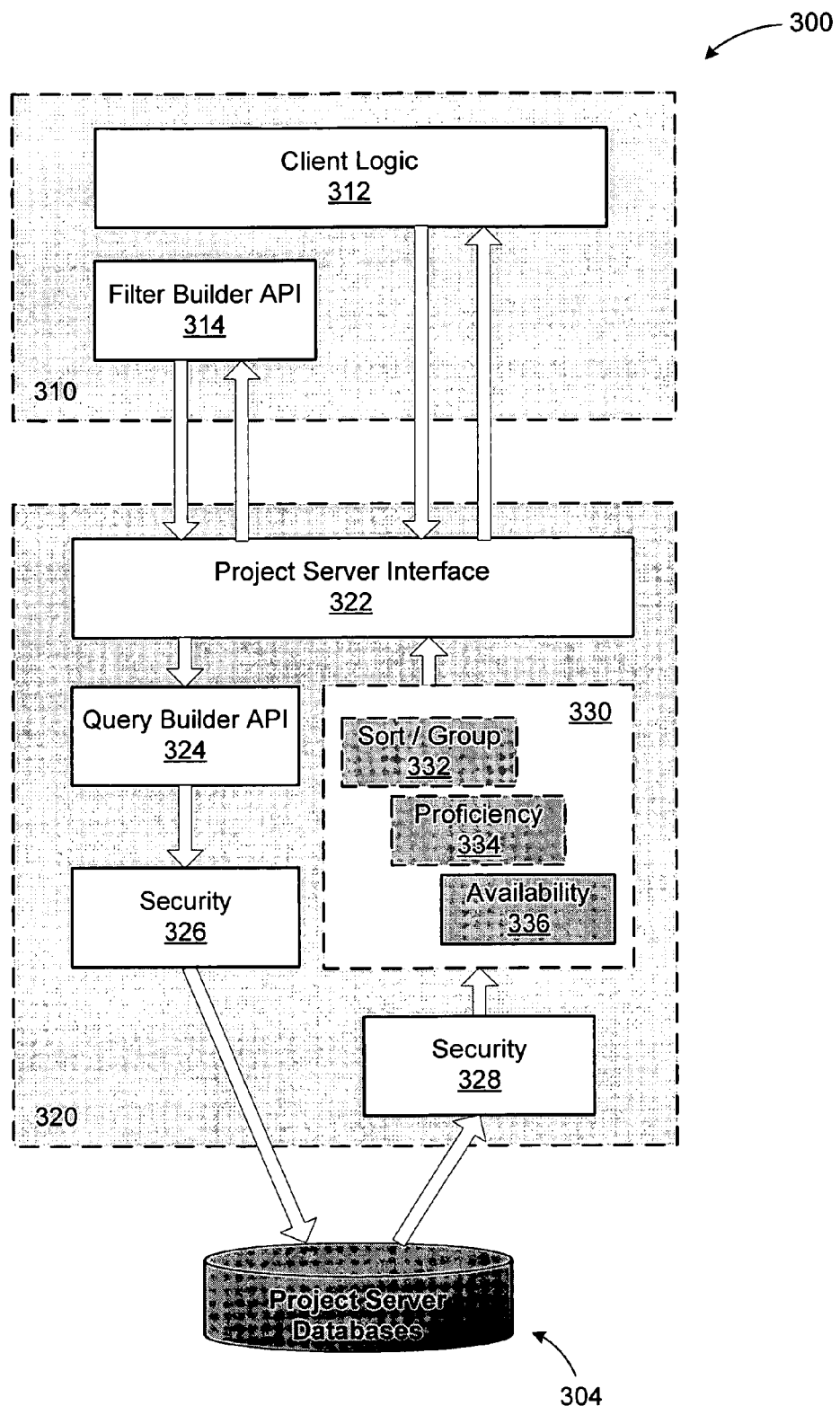
FIG. 3 is a functional block diagram illustrating interactions between a client, a server, and project server databases in a project management system implementing server-side filtering, sorting, and field level security.

FIG. 3 illustrates functional block diagram 300 of interactions between a client, a server, and project server databases in a project management system implementing server-side filtering, sorting, and field level security.

Use of assigned access attributes in determining which data to retrieve from the project database greatly enhances security aspects of the project management system. A middle layer is formed between the project application and the project database. In some embodiments, information about the user requesting a report is gathered to determine whether they have been granted access to the data and at what level. Each user's permissions may be determined by the permissions assigned to the user in an access rights table, one or more rules that combine access rights employing logic parameters, or by a system administrator.

When a filter/sort query is formed to retrieve data for a report, the assigned access attributes are first checked to determine if a portion of the data (e.g. specific fields in a project or data associated with a whole project in a multi-project system) is restricted. If the user does not have access to that portion of the data, it is not retrieved or included in the report. In another embodiment, the restricted data may be retrieved for calculation purposes, but not presented to the user without permission.

Referring to FIG. 3, client logic 312 within client application 310 uses Filter Builder API 314 to build a filter that is then passed to server 320 that implements a filtering API on the server middle tier.

In one embodiment, the filtering API is called Query Builder API (324). Query Builder 324 is responsible for building database queries that return the data, wrapping security around the query, and ensuring the data is not extracted through metadata. The filter and the query may be formed as eXtensible Mark-up Language (XML) documents.

Without an adequate security mechanism, data may be extracted through metadata by users without permissions. For example, in a project system that simply hides the restricted data, but does not remove it from filtering or sorting operations, a user may use multiple queries to focus on the hidden data. A user may also use sorts on "invisible" fields providing related information to retrieve the hidden data.

Accordingly, Query Builder API 324 interacts with security block 326 in preparing the query based on assigned access attributes. In some embodiments, the restricted data may be retrieved from project databases 304, and only used for calculations that are transparent to the user.

Non-database filters 330 may be applied to the retrieved data after it passes through security 328. Such filters may include filters based on resource availability within a specific time range (Availability 336), calculated proficiency (Proficiency 334), further sorting and grouping (Sort/Group 332), and the like. The filtering mechanism may be arranged to handle "soft schema" supporting customer-defined fields.

The project management system may also be enabled to handle two base security objects and to apply the rules consistently. The rules are applied depending on which of the base security objects is being used as the primary access path and which data is being retrieved. Project management system, typically, has two main objects: projects and resources, which overlap at the assignment level (where a resource is assigned to a task in a project). The data in the assignment may come from both the resource and the project.

Project Server Interface (PSI) 322 is responsible for ensuring that the filter makes sense within the context of its domain (for example, a routine that deals exclusively with resource data does not expect project data in the filter). PSI 322 also invokes Query Builder API 324.

Applying the filtering and security mechanisms after all of the data is retrieved from project server databases 304 may be costly with regard to processing resources. This work may not be shared with client application for security reasons. Hence, field access control in retrieving data is directed at providing the needed security.

Figure 4:
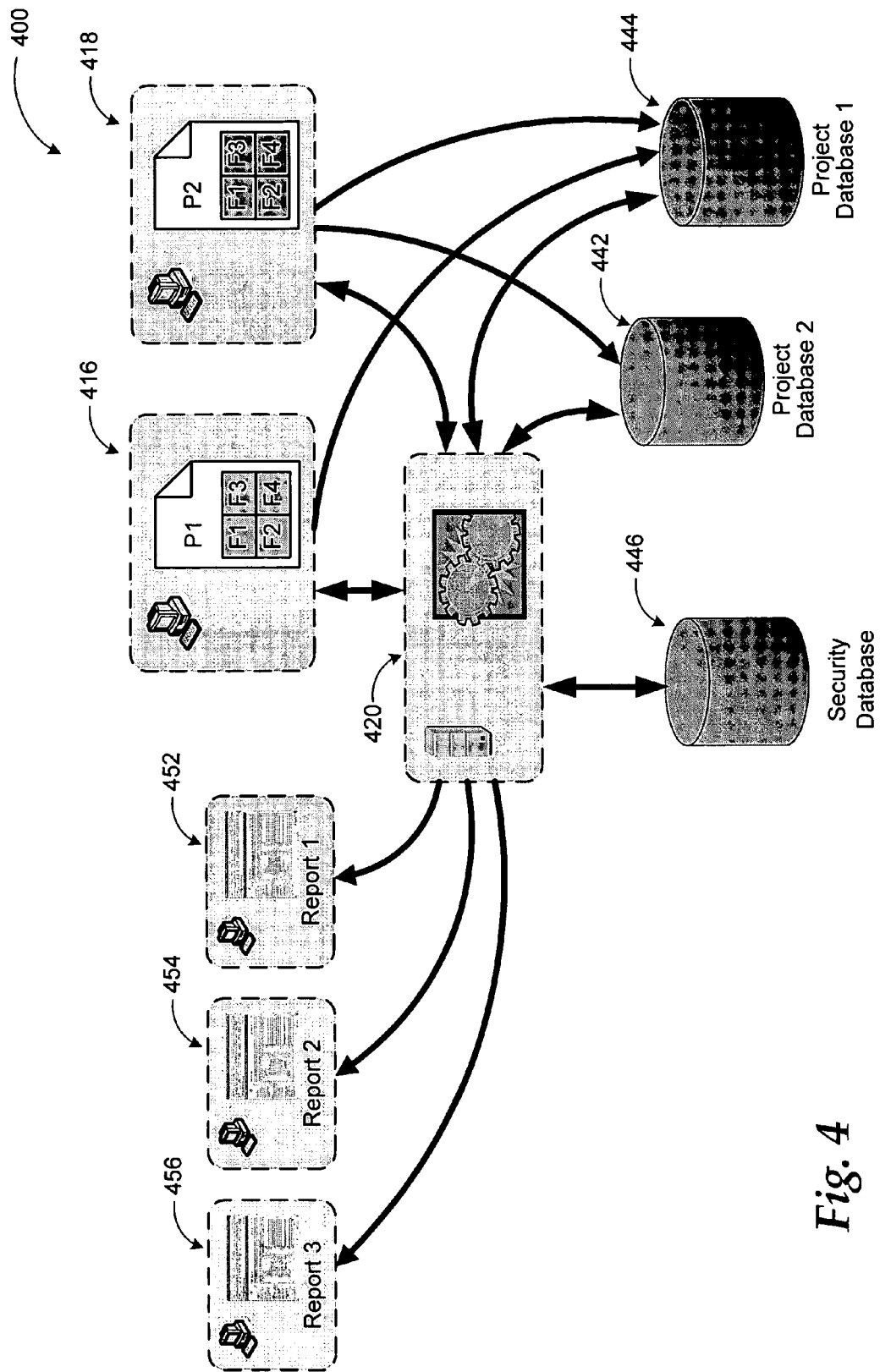
FIG. 4 is a conceptual diagram illustrating an architecture of a project management system implementing server-side filtering, sorting, and field level security.

FIG. 4 is a conceptual diagram illustrating an architecture of project management system 400 implementing server-side filtering, sorting, and field level security.

In the example architecture, individual projects P1 and P2 are managed locally at sites 416 and 418. Sites 416 and 418 may be client devices, client applications running on client devices, client applications running on a central server, and the like. In one embodiment, projects P1 and P2 may be managed partially or completely by project server 420. In another embodiment, client devices 416 and 418 may provide information to project server 420 for project roll-ups and enterprise level management tasks, and request reports from project server 420.

Field access control may be applied to individual fields or to groups of fields. For example, the individual fields may be types such as default fields, local custom fields, enterprise level custom fields, and the like. The groups of fields may be groups such as costs, baselines, and the like.

Sites 416 and 418 may provide their input data directly to project database 1 and project database 2 (442 and 444). Project server 420 is also configured to retrieve and save project data to the databases 442 and 444. In another embodiment, project server 420 may save security information such as permission rules, assigned access attributes, and the like, in security database 446.

In addition to performing actions associated with project calculations, project server 420 may publish project reports, such as summary task cost calculations, schedules, cost accruals, and the like, to clients and other users (e.g. enterprise servers) in reports 1, 2, 3 (452, 454, and 456).

The invention is not limited to the example components and operations described in conjunction with FIGS. 2, 3, and 4. Other components and operations may be implemented using the principles described herein.

Figure 5:
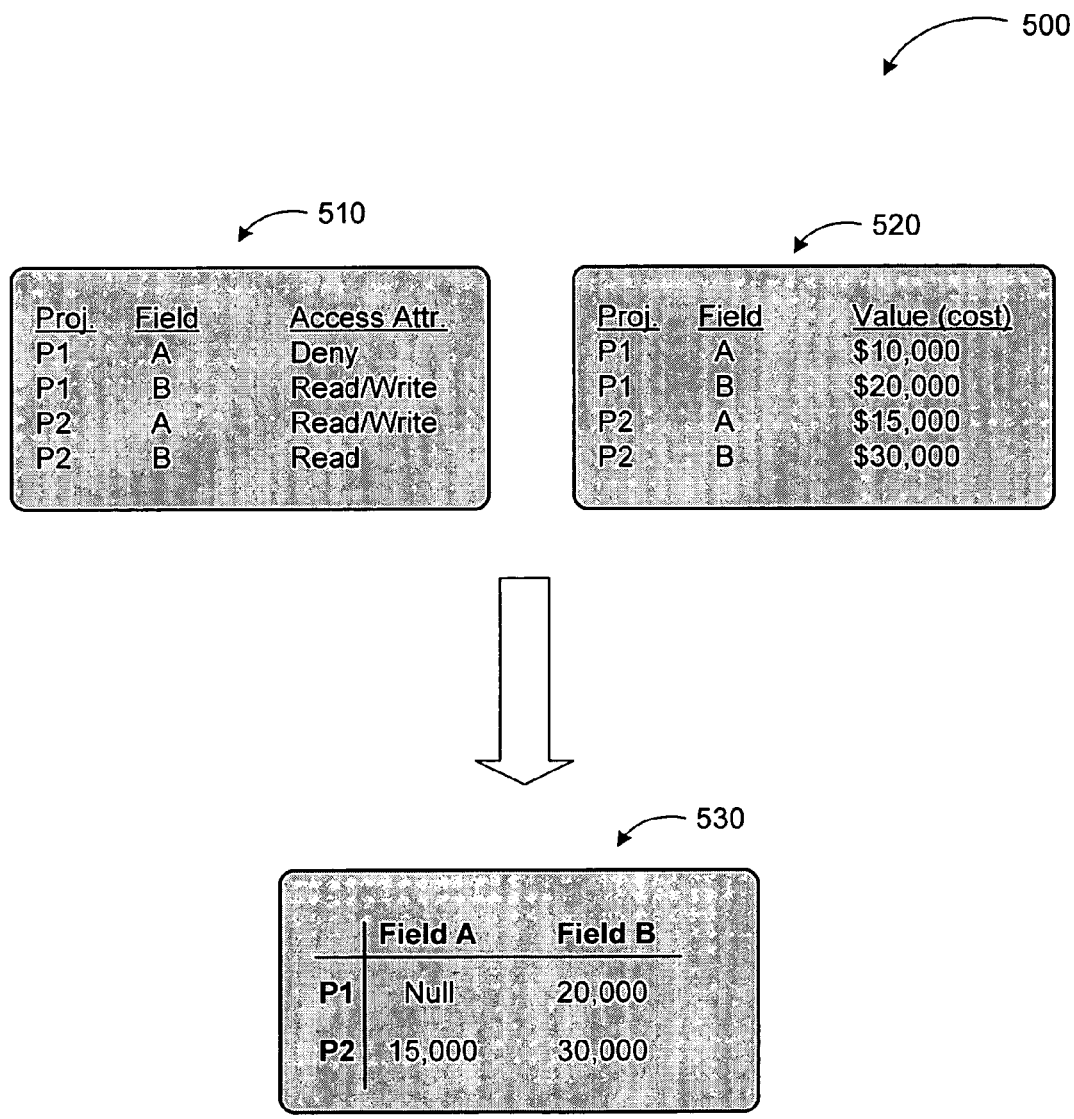
FIG. 5 illustrates generation of an example report table base on original data and assigned access attributes.

FIG. 5 illustrates generation of an example report table base on original data and assigned access attributes.

As diagram 500 shows, a field access table containing assigned access attributes may be generated from permission rule(s). Example table 510 shows two fields (A and B) of two projects (P1 and P2). Access attributes for a particular user are assigned based on a permission rule for each field. In the example table, the user has no access permission to field A of project P1, read/write access permission to field B of project P1 and field A of project P2, and read only access permission to field B of project P2.

Example table 520 shows actual values of the selected fields within a project database. The values may be cost, resource level, baseline, baseline cost, etc. As described previously, the fields may be selected based on criteria generated by a filter builder API in response to selection rules provided by a user.

Applying the security mechanism and the extensible filtering mechanism, a project server retrieves selected data and generates a primary table such as table 530. Table 530 reflects actual values of the selected fields for each project with the restricted values (fields with "deny" attribute, e.g. field A of project P1) having a "null" value.

The selected fields are then sorted according to predetermined criteria. During the sorting, "null" value fields are not included in the pool of fields preventing a "process of elimination" type circumvention of the security mechanism.

The invention is not limited to the attributes, field types, and tables discussed above. Other attributes, field types, tables, and the like may be implemented using the principles described herein.

Figure 6:
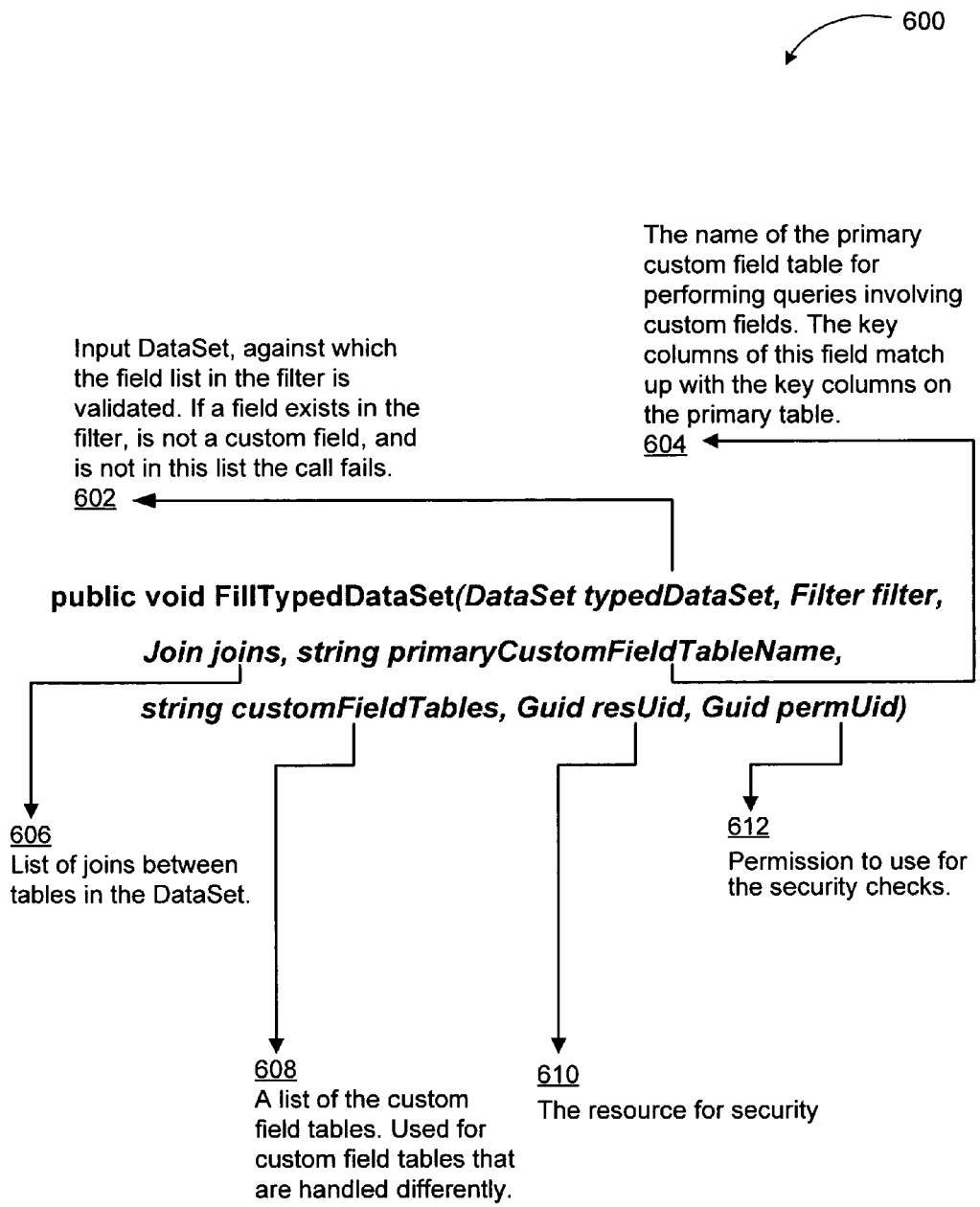
FIG. 6 illustrates an example command structure for implementing server-side filtering, sorting, and field level security in a project management application.

FIG. 6 illustrates example command structure 600 for implementing server-side filtering, sorting, and field level security in a project management application.

The example routine "FillTypedDataSet" may be called by a project server interface upon receiving a filter from a project client. First parameter within "FillTypedDataSet" is DataSet (602) defining the input data set against which the field list in the received filter is validated. If a field listed in the filter does not match the context of the filter's domain (e.g. a task field for a filter intended for a resource data set), the filter is rejected. DataSet 602 is followed by the Filter parameter defining the received filter.

The parameters associated with the filter are followed by "Joins" (606), which is a list of joins between the tables in the data set. This is followed by the string variable "primaryCustomFieldTableName" (604) defining the primary custom field table for performing queries involving custom fields.

Next string variable "customFieldTables" (608) is a list of custom field tables that are to be handled differently. The guid, "resUid" (610), is the resource for security that is used to restrict data access to the list of projects/resources available to the caller. The guid, "permUid" (612), includes the permission list for security checks.

Figure 7:
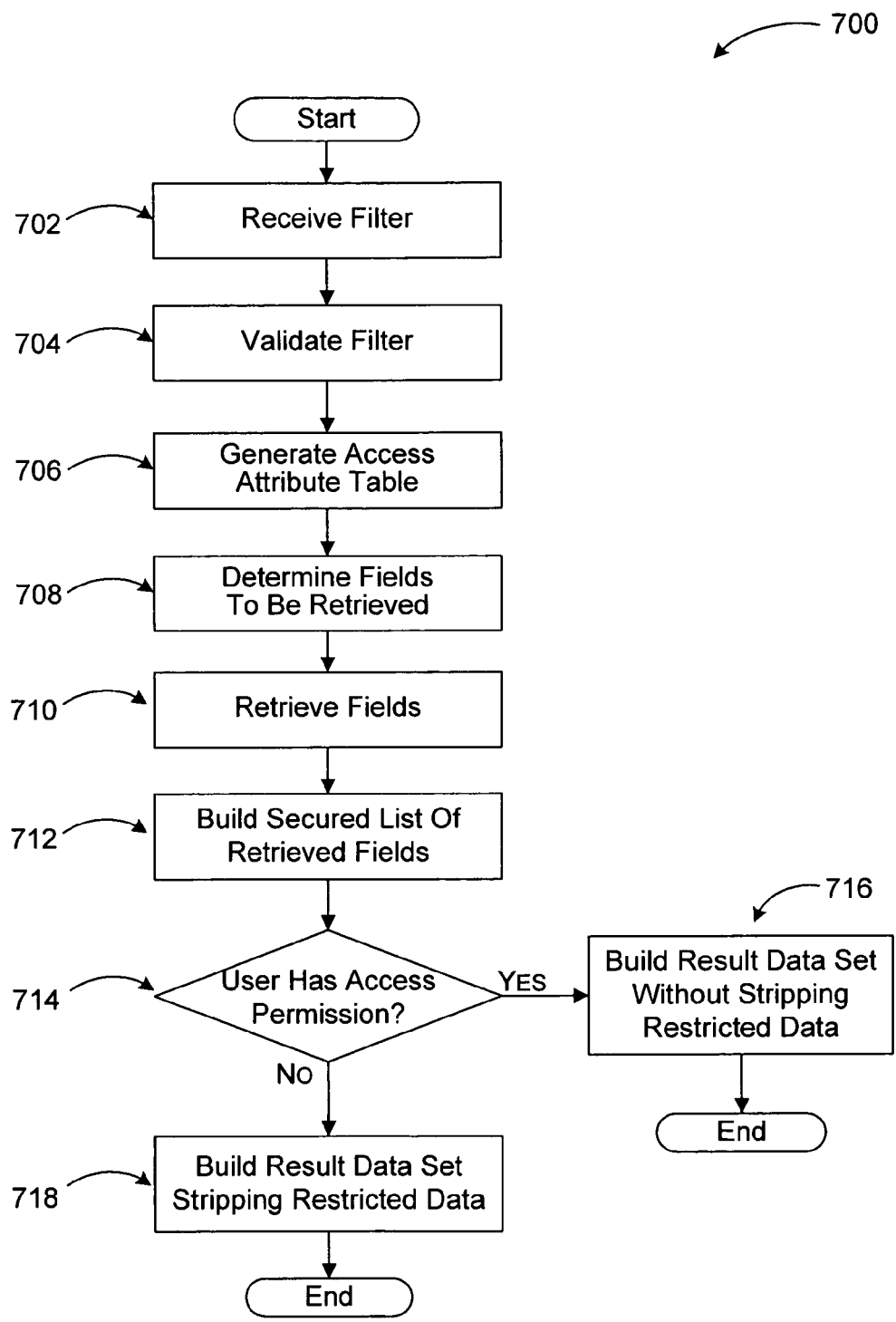
FIG. 7 illustrates a logic flow diagram for a process of implementing server-side filtering, sorting, and field level security in a project management system.

FIG. 7 illustrates a logic flow diagram for process 700 of implementing server-side filtering, sorting, and field level security in a project management system.

According to one embodiment, a computer-implemented method for securely filtering data in a project management system includes preparing a filter based on a pre-defined selection criterion for project associated data and retrieving the selected data from a project database. A restriction status of the selected data is then determined based on an assigned access attribute, and the retrieved data is sorted based on the selection criterion and the restriction status. The sorted data is provided to a client application, with a null value for restricted portions of the data.

The filter may be validated for syntax and available data in the database. The selection criterion and the assigned access attribute may be derived from a rule. The retrieved data may be employed in a user-transparent project calculation regardless of the restriction status. In one embodiment, the data is a field associated with a task or a resource of a project. The field may be a default field, a custom field, an extrinsic field, or an intrinsic field. The data may also include fields associated with a plurality of projects.

The assigned access attributes may be a read permission, a read-and-write permission, or a no-access permission. The assigned access attributes may be based on a default rule, a user-defined rule, or an extensible rule. The rules may be modified dynamically, if the original data is modified by a user with permission.

Process 700 begins at operation 702, where a filter constructed by a routine in a project client is received at the project server. The client may use Filter Builder classes to construct the filter from one or more rules as described previously. Processing proceeds from operation 702 to operation 704.

At operation 704, the project server interface validates the filter verifying the filter matches the context of its domain, etc. Processing then advances to operation 706.

At operation 706, and access attribute table is generated. The access attribute table may be generated from a set of permission rules, retrieved from a security database, provided by a system administrator, and the like. Processing moves from operation 706 to operation 708.

At operation 708, the fields to be retrieved are determined. The fields to be retrieved are determined from selection criteria (or rules) provided by the filter. Processing moves next to operation 710.

At operation 710, the selected fields are retrieved from the project database. As mentioned previously, retrieval and processing of selected fields only, as opposed to all of the fields, significantly increases processing resource efficiency and reduces security risks. Processing advances from operation 710 to operation 712.

At operation 712, a secured list of retrieved fields is built. Data included in the secured list of fields is used to determine which fields are to be removed before sorting and presenting the sorted data to the user. Processing moved from operation 712 to decision operation 714.

At decision operation 714, a determination is made whether the user has required access permission(s). In a complex data set and project management system a set of data may be provided to multiple users with different permissions for each field. In one embodiment, user permissions may be conditional based on other variables such as location, time, stage of project, and the like. If the user has permission for a field, processing advances to operation 716.

At operation 716, a data set is built by sorting the retrieved fields without stripping any of the field values. Processing then moves to a calling process for further actions.

If the user does not have requisite permission for one or more of the fields, processing advances to operation 718 from decision operation 714. At operation 718, the data set is built by sorting the retrieved fields and stripping any fields for which the user lacks access permission.

The restricted fields may still be used for user-transparent calculations, but not included in the sorting process to prevent process of elimination type circumventions. After optional operation 718, processing moves to a calling process for further actions.

The operations included in process 700 are for illustration purposes. Using server-side filtering, sorting, and field level security in a project management system may be implemented by a similar process with fewer or additional steps, as well as in different order of operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer storage medium comprising computer readable instructions that when executed on a computer, cause the computer to:

determine a selection criterion based on a selection rule;

assign access attributes to each field in a plurality of fields, the plurality of fields being included in a set of project data, the set of project data being associated with a project, the access attributes indicating whether a user of a client device is permitted to access the fields to which the access attributes are assigned;

receive, from the client device, a filter based on the selection criterion, the filter indicating selected fields that the user of the client device wants to view, the selected fields being ones of the fields in the set of project data;

generate an access attribute table that indicates the ones of the access attributes that are assigned to the selected fields;

generate a query that describes the selected fields;

retrieve, from a project database that stores the set of project data, selected field data, the selected field data being data associated with the selected fields;

use restricted field data to calculate non-restricted field data, the restricted field data being data associated with restricted fields, the non-restricted field data being data associated with non-restricted fields, the restricted fields being ones of the selected fields to which the access attribute table indicates the user has no access, the user not being able to read or write data in a field when the user has no access to the field, the non-restricted fields being ones of the selected fields to which the access attribute table indicates the user has access;

after causing the computer to use the restricted field data to calculate the non-restricted field data, substitute the restricted field data with null values;

after causing the computer to substitute the restricted field data, sort the selected field data based on the selection criterion;

after causing the computer to sort the selected field data, apply at least one additional filter criterion to the selected field data; and after causing the computer to apply the at least one additional filter criterion to the selected field data, provide the selected field data to the client device.

2. The computer storage medium of claim 1, wherein after the computer readable instructions cause the computer to sort the selected field data, the computer readable instructions further cause the computer to dynamically modify, when the user modifies a given field in the plurality of fields, the selection rule and the access attributes assigned to the given field in the plurality of fields.

3. The computer storage medium of claim 2, wherein each of the selected fields is associated with at least one of: a task and a resource of the project, and wherein each of the selected fields is one of: a default field, a custom field, an extrinsic field, and an intrinsic field.

4. The computer storage medium of claim 1, wherein the selection criterion includes at least one Structured Query Language (SQL) query type.

5. The computer storage medium of claim 1, wherein after the computer readable instructions cause the computer to sort the selected field data, the computer readable instructions further cause the computer to use the selected field data in one of: a user-transparent project operation, a user-specified operation, and a report.

6. The computer storage medium of claim 1, wherein after the computer readable instructions cause the computer to sort the selected field data, the instructions further cause the computer to modify a portion of the selected fields based on the selected field data.

* * * * *